(Model.)
J. P. HISLEY.
TRACE BUCKLE.
No. 249,836.  Patented Nov. 22, 1881.
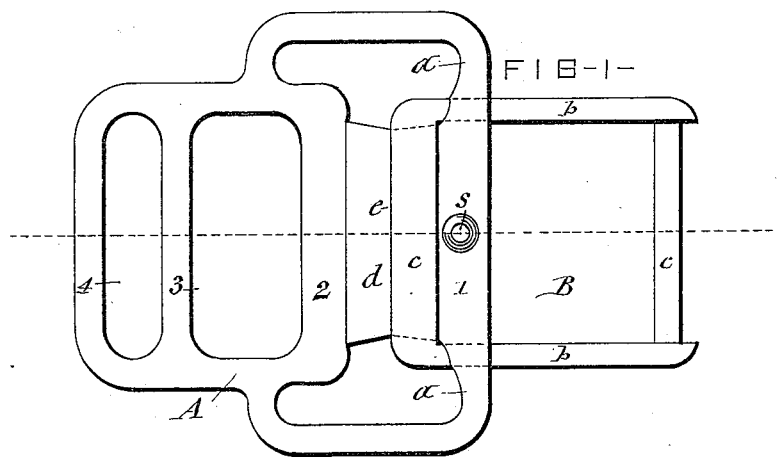
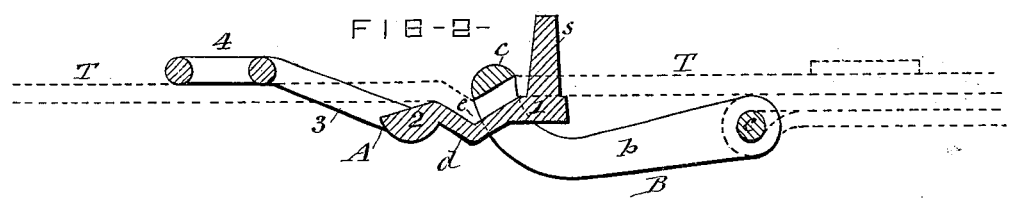
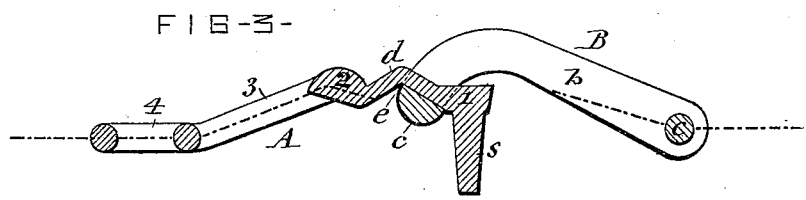
WITNESSES=  INVENTOR=

UNITED STATES PATENT OFFICE.

JOHN P. HISLEY, OF SYRACUSE, NEW YORK.

TRACE-BUCKLE.

SPECIFICATION forming part of Letters Patent No. 249,836, dated November 22, 1881.

Application filed October 7, 1881. (Model.)

*To all whom it may concern:*

Be it known that I, JOHN P. HISLEY, of Syracuse, in the county of Onondaga, in the State of New York, have invented new and useful Improvements in Trace-Buckles, of which the following, taken in connection with the accompanying drawings, is a full, clear, and exact description.

This invention has particular reference to the trace-buckle for which I have obtained Letters Patent No. 160,909, and dated March 16, 1875.

My present invention consists, essentially, in casting the buckle-frame with a central tie-plate, which connects the two forward cross-bars of said frame, and casting loosely around the said parts the sliding bail, having both of its cross-bars integral with its side bars, thereby obtaining a simple, strong, and durable buckle, in which all parts are permanently connected.

The invention also consists in providing the aforesaid tie-plate of the buckle-frame with a depression extending the width thereof, so that the trace which passes over said depression will become bent or tortured by the pressure of the rear cross-bar of the bail upon the trace, and thus receive a firmer hold upon the buckle, and become to a great extent relieved of the strain incident to the draft of the buckle-tongue, which penetrates the trace.

In the annexed drawings, Figure 1 is a plan view of my improved trace-buckle. Fig. 2 is a longitudinal section of the same, showing its application to the trace; and Fig. 3 illustrates the manner of connecting the bail to the buckle-frame by casting one of said parts loosely around the other.

Similar letters of reference indicate corresponding parts.

A represents the buckle-frame, composed of two cross-bars, 1 and 2, a loop, 3, on the rear cross-bar, adapted to receive through it the trace, a smaller loop, 4, on the rear of loop 3, for the attachment of the side strap of the harness, two loops, $a\ a$, respectively on opposite sides of the buckle-frame, and a rigid spur, $s$, on the forward cross-bar, 1, said elements being all cast in one piece to form the aforesaid buckle-frame A.

B is the sliding bail, which binds the trace on the buckle-frame A, said bail consisting of two curved side bars, $b\ b$, united at their ends by cross-bars $c\ c$, which are integral with or cast on the side bars, the forward cross-bar $c$ having secured to it the tug which is connected to the hame, and the rear cross-bar being brought across the top of the buckle-frame by the side bars, $b\ b$, passing around the under side of the forward cross-bar, 1, of the buckle-frame, and curved upward sufficiently to bring the rear cross-bar of the bail in the aforesaid position.

The trace T passes through the loop 3 of the buckle-frame, thence under the rear cross-bar $c$ of the bail, and by a hole in the trace engages the spur $s$ on the forward cross-bar of the buckle-frame. The free end of the trace enters the usual loop on the tug.

Heretofore the bail B was made detachable from the buckle-frame, and connected thereto either by passing the rear cross-bar of the bail through an opening between the two cross-bars 1 and 2 of the buckle-frame, or by making one of the cross-bars $c$ of the bail detachable from the side bars of said bail. Both of said constructions have their objectionable features. The first-mentioned construction requires great care in packing the said buckles for the trade, so that an equal number of buckle-frames and bails are put up in each package; otherwise one or more sets of buckles would be incomplete and useless. Furthermore, the separation of the central or main portion of the cross-bars 1 and 2 of the buckle-frame deprived the forward cross-bar, 1, of the requisite support, and frequently caused the same to bend or break when subjected to the strain of the trace. The other aforesaid prior construction necessitates the extra labor and expense of drilling the ends of the side bars of the bail and attaching thereto an extra bolt to form the cross-bar of the bail.

To overcome said difficulties I connect the two cross-bars 1 and 2 by a tie-plate, $d$, which I cast on the buckle-frame with the bail connected thereto in the following manner: I first mold a pattern of the buckle-frame with the bail connected thereto, as illustrated in Fig. 3 of the drawings, in which the dotted line indicates the line of separation between the cope and the flask. I then place in the impression left in the molding-sand one of the parts cast separately. Then, after sprinkling upon the same fine sand or dust and replacing the cope, I pour in the metal, and cast around the aforesaid casting the other part of the buckle, the dust upon the former preventing the two castings from adhering to each other. In order to obtain a firm hold upon the trace, I make the tie-plate with a depression, $e$, as shown. The rear cross-bar of the bail, being over said depression, presses the trace into the same, and thus firmly binds the trace on the buckle, and to a great extent relieves the spur $s$ of its hold on the trace.

Having described my invention, what I claim as new, and desire to secure by Letters Patent, is—

1. The improved buckle herein described, consisting of the buckle-frame A, having the tie-plate $d$, connecting the two cross-bars 1 and 2, and the bail B, having both cross-bars $c\ c$ integral with the side bars, $b\ b$, and the whole permanently united by the casting of one part loosely around the other, substantially in the manner described and shown.

2. In combination with the sliding bail B, the buckle-frame A, having the loops $a\ a$ over the side bars of the bail, and the tie-plate $d$, passing under the cross-bars $b$ of the bail, and having the depression $e$ in said tie-plate, substantially in the manner set forth and shown.

In testimony whereof I have hereunto signed my name and affixed my seal, in the presence of two attesting witnesses, at Syracuse, in the county of Onondaga, in the State of New York, this 4th day of October, 1881.

JOHN P. HISLEY. [L. S.]

Witnesses:
E. S. DAWSON,
C. T. ROSE.